US008561028B1

(12) United States Patent
Zuckerman (10) Patent No.: US 8,561,028 B1
(45) Date of Patent: Oct. 15, 2013

(54) METHODS AND SYSTEMS FOR DEBUGGING EVENT-DRIVEN SOFTWARE APPLICATIONS (75) Inventor: David Zuckerman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 968 days.

(21) Appl. No.: 12/464,275

(22) Filed: May 12, 2009

(51) Int. Cl.
*G06F 9/44* (2006.01)
*G06F 3/00* (2006.01)
*G06F 9/46* (2006.01)
*G06F 13/00* (2006.01)

(52) U.S. Cl.
USPC ........... 717/125; 717/124; 717/126; 717/127; 717/128; 717/129; 717/130; 717/131; 717/132; 717/133; 717/134; 717/135; 719/318

(58) Field of Classification Search
None
See application file for complete search history.

(56) References Cited

U.S. PATENT DOCUMENTS

| 5,987,514 | A * | 11/1999 | Rangarajan | 709/224 |
| 6,363,435 | B1 * | 3/2002 | Fernando et al. | 719/318 |
| 7,559,065 | B1 * | 7/2009 | Sosnovsky et al. | 719/318 |
| 8,176,467 | B2 * | 5/2012 | Weng et al. | 717/106 |
| 2008/0004856 | A1 * | 1/2008 | Avitzur et al. | 703/17 |
| 2009/0319996 | A1 * | 12/2009 | Shafi et al. | 717/125 |

OTHER PUBLICATIONS

Ehab Al-Shaer; High-performance Event Filtering for Distributed Dynamic Multi-point Applications: Survey and Evaluation. Oct. 1997—Publisher Old Dominion University Norfolk, VA, USA website: http://dl.acm.org/citation.cfm?id=890608 pp. 13-14.*
Patrick Mineault, Using EventDispatcher, available at http://www.actionscript.org/resources/articles/204/1/Using-EventDispatcher/Page1.html (last accessed May 8, 2009).

* cited by examiner

*Primary Examiner* — Idriss N Alrobaye
*Assistant Examiner* — Ronald Modo
(74) *Attorney, Agent, or Firm* — Kilpatrick Townsend & Stockton LLP (57) ABSTRACT

A computer can be configured to execute event-driven applications by programming the computer with software that provides an event-driven execution environment including an event dispatcher. The event dispatcher can be used to relay events by receiving and dispatching the events from software components of an event-driven application during execution thereof. While the event-driven application is executing, the event dispatcher can be monitored in order to generate and store a log or other record(s) identifying one or more events that occur during execution. The log can be stored in a computer-readable medium accessible by the computing apparatus and used to provide information about at least some of the one or more events. As an example, the log data may be used to generate a timeline showing the relative order of events and the components that generated and listened to the events.

18 Claims, 4 Drawing Sheets

METHODS AND SYSTEMS FOR DEBUGGING EVENT-DRIVEN SOFTWARE APPLICATIONS

TECHNICAL FIELD

The disclosure below generally relates to software development, particularly to development applications for authoring/editing software applications.

BACKGROUND

An event-driven application is an application that can be executed using an execution environment that relays events between different program components of the application. Some program components may be event generators, some program components may be event listeners, and some program components may be both event listeners and event generators. For instance, an on-screen depiction of a link in a web browser may be created through use of a first program component that defines the size, shape, location, and other visual features of the link. The browser may include a second program component that tracks a cursor position relative to the screen. The appearance of the link may change when the mouse hovers over the link by configuring the first program component to listen for an event generated by the second program component.

Use of event driven frameworks can present coding and other development challenges. For example, in some event-driven applications over forty different events occur when the application is initialized. During debugging and testing, developers may find it difficult to isolate the cause of a desired or unwanted behavior due to the numerous interactions between different event generating and listening components.

SUMMARY

One or more aspects of the present subject matter can be used to debug, test, or otherwise develop an event-driven application by monitoring event dispatching activity that occurs while the application is executed.

In some embodiments, a method for application development can comprise configuring a computing apparatus to execute event-driven applications by programming the computing apparatus to provide an event-driven execution environment including an event dispatcher. The method can comprise accessing, via the computing apparatus, data representing the event-driven application and executing the event-driven application on the computing apparatus.

During execution, the event dispatcher can be used to relay events by receiving and dispatching the events from program components of the event-driven application. While the event-driven application is executing, the event dispatcher can be monitored in order to generate and store a log or other record(s) identifying one or more events that occur during execution. The log can be stored in a computer-readable medium accessible by the computing apparatus and used to provide information about at least some of the one or more events. As an example, the log data may be used to generate a timeline showing the relative order of events and the components that generated and listened to the events.

Embodiments also include systems configured to provide event monitoring and logging, and computer-readable media tangibly embodying program code which, when executed, causes a computing device to provide event monitoring and logging.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Embodiments of the present subject matter may be useful in testing and development of event-driven applications. Event-driven applications may be executed in an execution environment that provides suitable support, with the term "execution environment" meant to be synonymous with runtime environment. Some embodiments of methods in accordance with the present subject matter may comprise providing a computing apparatus that executes event-driven applications and is capable of or configured to provide information about event-driven applications executed within or with the support of the execution environment.

This can be achieved in some embodiments by programming the computing apparatus to provide the event-driven execution environment including an event dispatcher, with the event dispatcher used in providing the information as the application(s) under development or testing execute. Suitable execution environments include, but are not limited to, ADOBE® FLASH® or AIR™, and ADOBE® FLEX BUILDER™ represent examples of a suitable development environment for such applications; all of the above products are available from Adobe Systems Inc. of San Jose, Calif.

Figure 1:
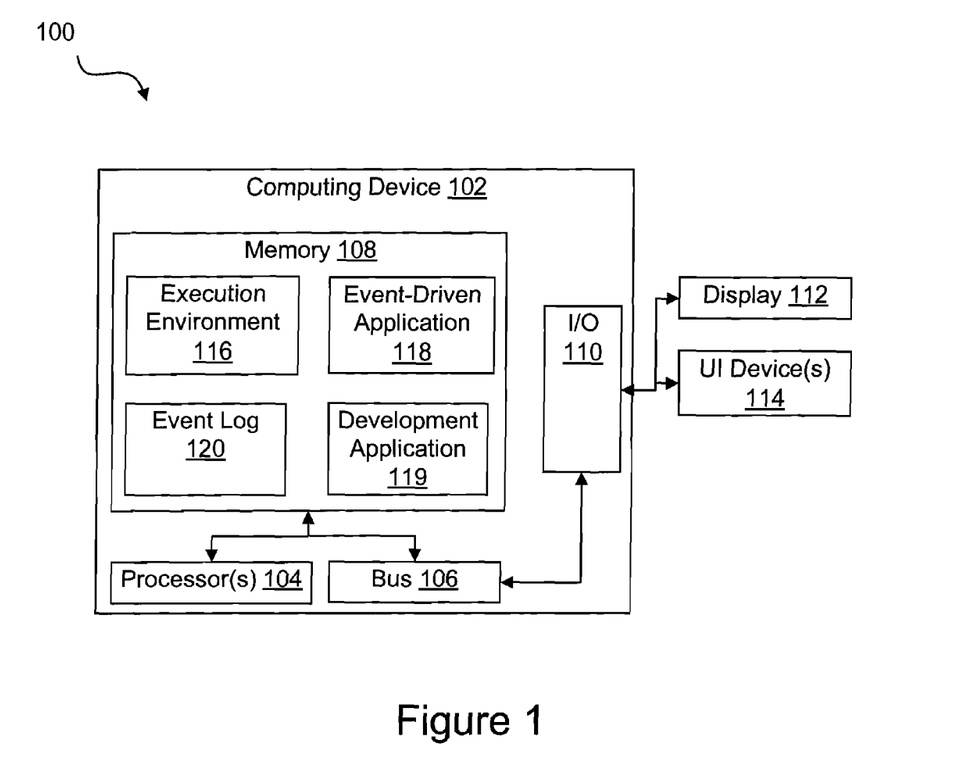
FIG. 1 is a block diagram showing an example of a computing system configured to support event-driven application development.

FIG. 1 is a block diagram showing an example of a computing system 100 configured to support event-driven application development. In this example, system 100 includes a computing device 102 comprising one or more processors 104, a bus 106, memory 108, input-output (I/O) handling components 110, a display 112, and user input (UI) devices 114 (e.g., a mouse, keyboard, etc.). Memory 108 represents one or more computer-readable media accessible by processor(s) 104, and in this example embodies an execution environment 116 that supports event-driven applications and one or more event driven applications 118 that are under development or testing via development application 119. Memory 108 also embodies an event log 120 which can be produced or updated by development application 119 during development or testing of event-driven application 118. Memory 108 may include further components or applications such as an operating system and the like, although in some embodiments the operating system itself may comprise an event-driven execution environment In accordance with aspects of the present subject matter, development application 119 may be configured to interface with execution environment 116 and monitor how execution environment 116 handles events generated by and listened to by various program components of event-driven application 118. Development application 119 may comprise a full-featured integrated development environment (IDE) in some embodiments and can include common features such as a text or graphic-based code editor, compiler, debugger, and code management capabilities, although these additional features are not included in some embodiments.

In some embodiments, execution environment 116 comprises a developer-specific version that is configured for use in testing application functionality. For example, execution environment 116 may be configured with an event dispatcher that supports interfacing with monitoring functionality of development application 119, or may even be configured to send development application 119 a copy of each event received or dispatched.

However, in some embodiments, development application 119 obtains event data by monitoring a "standard" version of execution environment 116. For example, execution environment 116 may store data identifying received and dispatched events in known memory locations that are monitored by development application 119 as event driven application 118 is executed.

Figure 2:
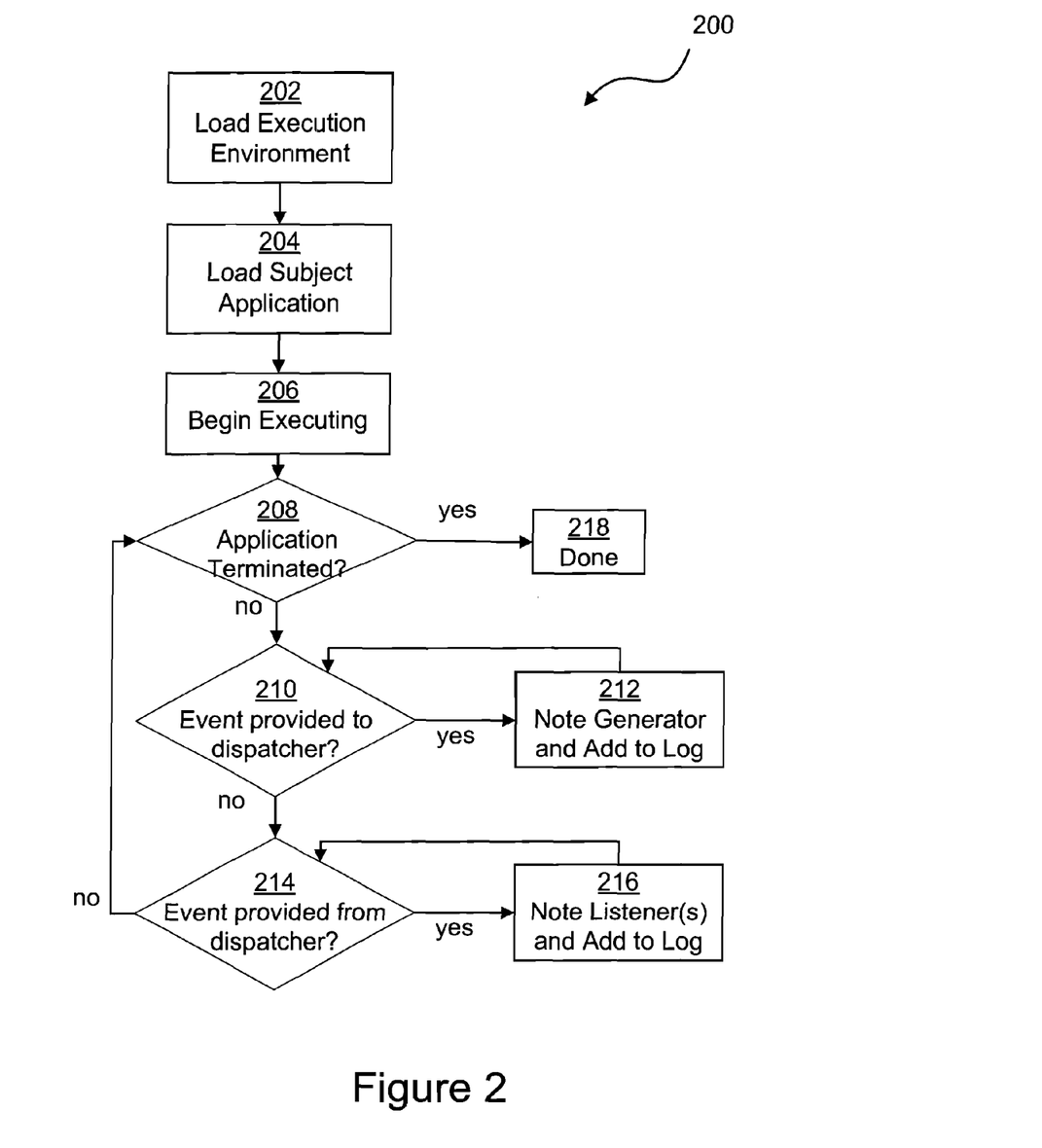
FIG. 2 is a flowchart showing steps in an example of a method for application development including tracking of events in an event-driven application.

FIG. 2 is a flowchart showing steps in a method 200 for application development including tracking of events in an event-driven application. At block 202 an execution environment is loaded into memory. At block 204, a subject application—that is, the event-driven application to be monitored—is loaded into memory, and at block 206 execution of the application begins.

For example, the source or object code of the subject application can be accessed and loaded into memory using initialization elements of the execution environment that instantiate objects and begin program flow as specified in the code of the application. For an event-driven application, some program components will be "event generators" and some program components will be "event listeners;" some program components will be both event listeners and event generators.

As an example, an event may be generated by a program component in response to user or other input, evaluation of conditions (e.g., values of a variable), and/or in response to the occurrence of other events (in which case the program component would be both an event listener for one event and an event generator for another event).

A program component may be an event listener in order to begin, end, or change behavior based on the event. For example, a user interface element may change the visual appearance of an onscreen component or generate a sound in response to an event. As another example, a program component that provides a request for data from a network or other source may provide its request in response to an event at initialization of the event-driven application (a startup event) so that the desired data is available for use by other program components of the application.

For example, the following ACTIONSCRIPT code segment specifies that a listener function called clickHandler( ) should respond to any mouse click event objects that are passed to a program component called myDisplayObject:

myDisplayObject.addEventListener(MouseEvent.CLICK, clickHandler);

"myDisplayObject" is an event listener, while another program component generates the MouseEvent that is listened to.

Returning to FIG. 2, method 200, block 208 checks whether the application is terminated (if so, the method ends at block 218). For instance, execution may be terminated when the application is finished or when a breakpoint is encountered.

If execution is to continue, however, then the method checks at 210 whether one or more events have been provided to the event dispatcher and checks at 214 whether any events have been provided from the dispatcher. At block 212, each event provided to the event dispatcher is noted in the log along with the program component that generated the event and at block 216, each program component that listens to an event is noted in the log. The log may include additional information, such as an indication of the relative order in which events are provided to the event dispatcher and received from the dispatcher.

Figure 3:
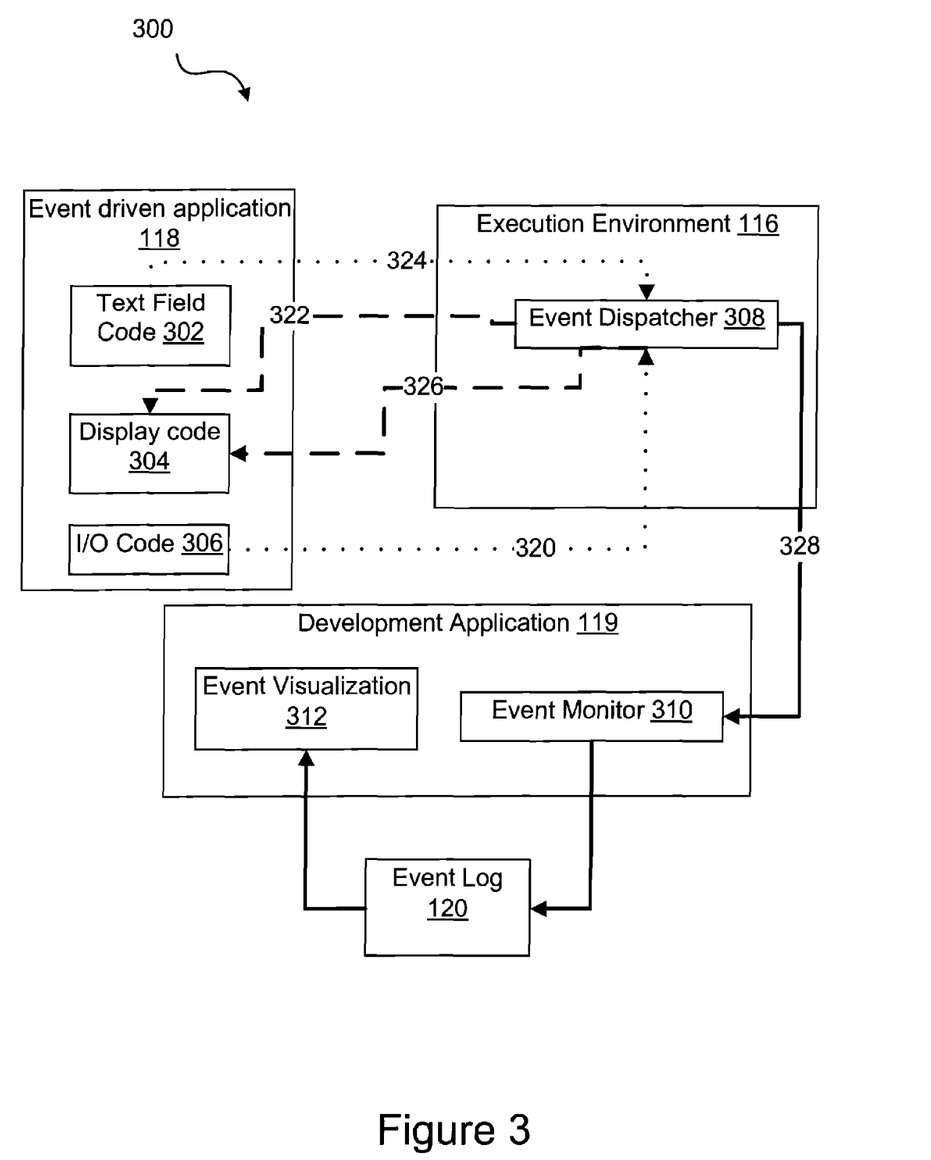
FIG. 3 is a block diagram illustrating an example of event logging based on events dispatched from and listened to program components of an event-driven application.

FIG. 3 is a diagram illustrating an example of event logging based on events dispatched and listened to program components of an event-driven application. Specifically, a data flow 300 depicts the occurrence of events when an application 118 is executed via an execution environment 116. For example, development application 119 may include a "debug" or "test" command that launches application 118 in execution environment 116.

Execution environment 116 provides a framework for executing the code of event driven application 118. For example, application 118 may be written with the expectation that base components for execution will be provided by execution environment 116. Runtime activities provided by execution environment 116 can include loading and linking of the classes needed to execute event driven application 118, optional machine code generation and dynamic optimization of the program, and initialization/execution of the code of application 118.

In this example, event driven application 118 includes several program components, including Text Field Code 302 which, when executed, provides a text entry and display box. Display code 304 displays text and/or graphics in another area of a display. I/O code 306 allows event-driven application 118 to respond to user input and output. In practice, an event-driven application may include more or fewer program components than are illustrated in this example.

Execution environment 116 includes an event dispatcher 308. For example, event dispatcher 308 may be used by execution environment 116 as a switchboard to relay and otherwise coordinate events generated by program components of application 118. In some embodiments, event dispatcher 308 is an instance of an event dispatcher class that is added to each event-driven application 118 executed via execution environment 116 (e.g., as a linked program component) along with other common components such as UI handlers, program components for handling file and network tasks, and the like as noted above.

Some embodiments use the event dispatcher as the centralized point for relaying events between program components of the application. Accordingly, a developer does not need to include functionality in the event-generating program components for sending events directly to event listeners, nor is there a need to include functionality in event-listening program components for obtaining events directly from event generators, although such functionality could be included for some situations. Put another way, at least some (or potentially all) of the program components that are event listeners do not directly receive events from event generators, and at least some (or potentially all) of the program components that are event generators do not directly provide the events to event listeners. Instead, the event dispatcher acts to identify generated events and provide indicators of the events to interested event listeners.

In some embodiments, each time a component of an event-driven application generates an event, an instance of an "Event" class is created with parameters such as an instance ID, the component that created the event, and/or parameters to be passed with the event. Event dispatcher 308 can track members of the "Event" class and provide suitable feedback to those program components that listen to the event.

In some embodiments, event dispatcher 308 consults an in-memory listing of program components that are event listeners. For example, code for the program component may identify one or more events for which the program component is an event listener. When the code for the program component is executed, the in-memory listing of event listeners can be updated.

In this example, Text Field Code 302 and I/O code 306 represent program components that are event generators. For example, I/O code 306 may generate one or more events 320 in response to input, such as mouse movements, gestures, or actions (e.g., left-click, right-click). Each event may include parameters—a movement event may identify the end coordinates of the gesture, for example, while an action event may identify whether a left click or a right click occurred along with the coordinates at which the click occurred. As another example, a left click and a right click may be defined as unique events with no parameters; it will be understood that the definition of events can be left to the preferences and desires of the developer(s) defining the software application and/or the execution environment.

Text Field code 302 may generate one or more events 324, such as an event identifying when text is entered into the text field; the entered text may be included as a parameter. Another example of an event generated by Text Field code 302 can include an event identifying when the Text Field is selected.

Display code 304 is an event listener in this example. For example, Display code 304 may listen for events 320 from I/O code 306 to update the display, such as highlighting text when a mouse hovers over the text or changing a graphic when the graphic is clicked. As shown at 322, when I/O code 306 generates an event 320, event dispatcher 308 consults the list of event listeners for such events and notifies the listeners, including display code 304. Display code 304 is also an event listener for events from text field code 302. For example, when new text is entered into a field created by Text Field Code 302, an event 324 may be reported and dispatched to code 304 as shown at 326 so that display code 304 can echo the text in another portion of the display.

In accordance with one or more aspects of the present subject matter, development application 119 includes an event monitor 310 that accesses data identifying the generated and dispatched events from event dispatcher 308. This access is shown at 328. As was noted above, in some embodiments, event monitor 310 can interface with event dispatcher 308 and function as an event listener for all events. However, in some embodiments, event dispatcher 308 may be unaware of event monitor 310—for example, event monitor 310 may simply identify the working memory used by event dispatcher 308 to identify newly-generated and dispatched events.

FIG. 3 also depicts event log 120 generated by development application 119 and event visualization component 312 of development application 119. Event monitor 310 may generate event log 120 from accessed event data 328 to create a listing identifying at least the relative order of events reported to and dispatched by event dispatcher 308. In some embodiments, data of the event log also includes the event ID, the identity of the program component that generated the event, the identity (or identities) of the program component(s) that listened to the event, the time (e.g., program count value) at which the event was provided to and dispatched by event dispatcher 308, and parameters included in the event.

Event visualization component 312 may be operative to provide output to allow a developer to analyze event log data. For example, a timeline of events indicating the relative order of two or more events may be depicted. As another example, a log view listing the events in order may be provided.

In some embodiments, development application 119 can support filtering so that log data for only certain events is displayed. For example, a developer may provide preference settings so that only events of a certain type, events by a certain event generator, and/or events dispatched to a certain event listener (or listeners) are displayed. The preferences may be applied to filter a full listing of all monitored events from event log 120 and/or may be used to control which events are monitored and logged by event monitor 310.

Figure 4:
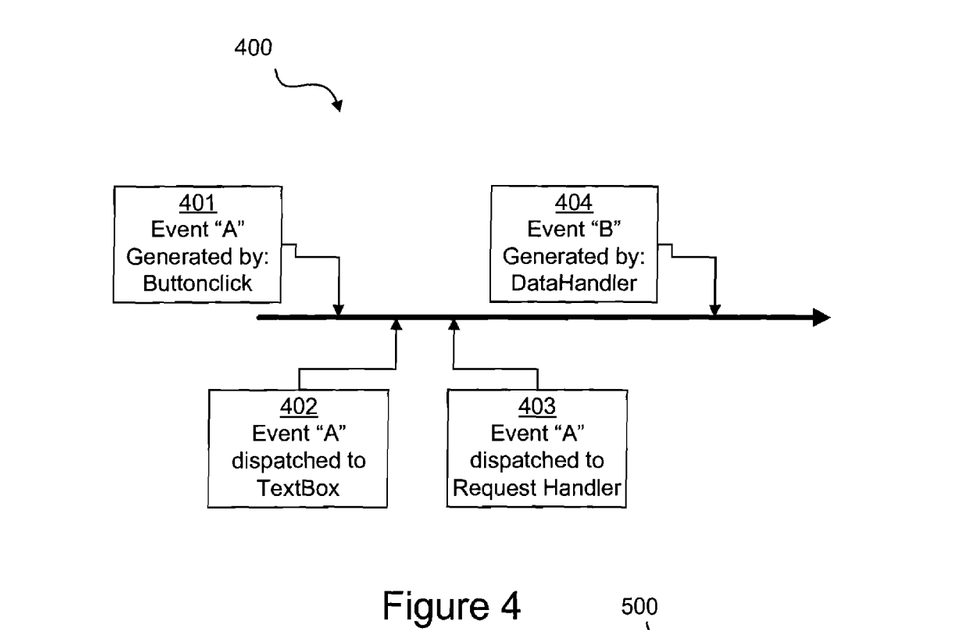
FIG. 4 illustrates an example of output generated from an event log.

FIG. 4 illustrates an example of output generated from an event log, specifically a timeline 400 showing four events 401, 402, 403, and 404. In this example, event generation activity is depicted above the timeline and event dispatch activity is depicted below the timeline. Each event is indicated via a window or icon along with text identifying one or more aspects of the event. In this example, at 401 an event "A" is identified along with the "Buttonclick" component that generated the event. For example, "Buttonclick" may be the name of a program component that generated a click event that is identified here as event "A." In practice, the generating component may be identified in more detail—for instance, the event may have a more complex identifier and the generating component may be identified as a particular instance of a class.

In this example, an instance of a "button" class is intended to update a text field with data requested from a network resource when the button is clicked. At 402, a dispatch of event "A" to a component identified as "Textbox" is shown. For example, Textbox may be a program component that updates the text field based on data accessed by one or more other components of the application.

However, in this example, a programming error is depicted. At 403, event A is also dispatched to a program component called "Request Handler" that sends a request (e.g., an http "GET" request) to a network resource. At 404, an event "B" is generated by a program component called "DataHandler"

that receives the incoming data; for example, event B may be an indication that the data has been successfully loaded.

The programming error illustrated in this example is that event A causes TextBox to update before Request Handler and DataHandler have updated the source data for TextBox. This error may be difficult to track or identify during development. On the one hand, if no source data for TextBox has been loaded when the button is clicked, the error may be apparent since the TextBox component will have no data to display unless the button is clicked twice.

On the other hand, consider the case where some source data is already available for TextBox to use. When the button is clicked, TextBox is "refreshed" with the existing data, and so some content should appear. The actual updated data will be loaded, but not displayed. Unless the developer is aware how the refreshed content should appear or notices that the refreshed data does not appear until the button is clicked twice, then he or she may not identify the coding error during testing. Even if the developer discovers the error by noting the unintended behavior of the program, tracing the source of the error may consume a considerable amount of time.

However, timeline 400 or other suitable data based on an event log can be used to readily identify the error and develop a fix. In this case, the developer may realize that TextBox should be refreshed in response to event B rather than event A and can accordingly make a quick change to the code for the application.

Figure 5:
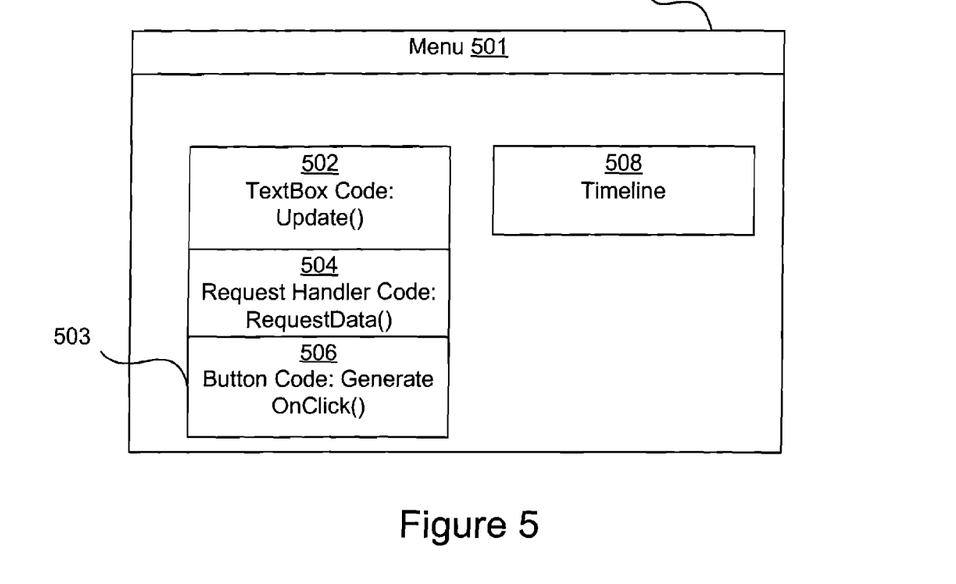
FIG. 5 illustrates an example of a user interface for a development application that includes output and other functionality based on an event log.

FIG. 5 illustrates an example of a user interface 500 for a development application that includes output and other functionality based on an event log. In this example, the user interface 500 of the development application includes a standard menu bar 501 along with one or more windows. In this example, a code window 503 displays code for the application under development while window 508 illustrates the timeline of FIG. 4. In this example, code window 503 depicts code segment 502 for TextBox, code segment 504 for Request Handler, and code segment 506 for the button in the example discussed above.

In some embodiments, a development application can provide output based on the event log that ties event log entries to one or more code elements corresponding to the logged events. For example, a user may be able to click on depictions of events in a timeline, log, or other view and jump to the corresponding code for the program component(s) that listen to or generate the event.

For example, to fix the error discovered through the use of timeline 400, a developer may click on event 402 as depicted in window 508. Code window 503 may then jump or scroll to code segment 502 that includes the update( ) response in the code for the TextBox component. If code segment 502 appeared in a separate file or was otherwise not currently displayed, the response would differ—for example, the development application may open the corresponding file containing code segment 502.

In this example, the code segments are represented as text, but development application may support other suitable methods for inputting and depicting code. For example, if code is entered using visual representations such as UML diagrams, then the appropriate diagrams or sections thereof can be shown.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method executed by a computing apparatus, comprising:
    executing a plurality of event-generating program components of an event-driven application, wherein the plurality of event-generating program components are configured to generate a plurality of events during execution of the event-driven application, wherein the plurality of event-generating program components comprise:
        an input code component configured to generate input events identifying respective inputs received via a graphical interface of the event-driven application, and
        an input/out code component configured to generate events for modifying the graphical interface in response to at least one of the input events;
    executing a plurality of event-listening program components, wherein each event-listening program component of the plurality of event-listening program components is configured to begin or end a respective behavior based on listening to at least one event from at least one of the plurality of event-generating program components, wherein at least one of the plurality of event-listening program components comprises a display code component configured to render text or graphics for display via the graphical interface in response to at least one of the events for modifying the graphical interface;
    relaying, by an event dispatcher program component executed by the computing apparatus, the plurality of events from the plurality of event-generating program components to the plurality of event-listening program components;
    while the event-driven application is executing, generating, by an event monitor program component, a log identifying the plurality of events;
    identifying, based on the log identifying the plurality of events, an erroneous operation by the event-driven application that is associated with at least some event-listening program components of the plurality of event-listening program components, wherein the erroneous operation is caused by an erroneous sequence of operations, wherein the erroneous sequence of operations is associated with modifying the graphical interface in response to at least one of the input events relayed by the event dispatcher program component;
    automatically generating an additional interface for presenting source code corresponding to each of the at least some event-listening program components associated with the identified erroneous operation; and
    responsive to input received via the additional interface, modifying at least some of the source code.

2. The method set forth in claim 1,
    wherein generating the log comprises identifying when the plurality of events occurred,
    further comprising outputting an indication of when a first event occurred with respect to when a second event occurred.

3. The method set forth in claim 2, wherein the indication comprises a timeline showing relative occurrences of the plurality of events.

4. The method set forth in claim 1, wherein the log comprises, for each event, a respective event identifier, a respective identity of a respective one of the plurality of event-generating program components that generated the event, and a respective identity of a respective one of the plurality of event-listening program components that listened to the event.

5. The method set forth in claim 4, wherein the log identifies, for each event, a relative time between when the event was generated and when the event was dispatched to the respective one of the plurality of event-listening program components that listened to the event.

6. The method of claim 1,
    wherein relaying the plurality of events comprises, for each of the events:
        receiving a respective event from a respective event-generating program component,
        identifying a respective event-listening program component for receiving the respective event, and
        providing the respective event to the event-listening program component.

7. The method of claim 6, wherein accessing data representing the plurality of events comprises identifying a portion of a computer-readable medium used by the event dispatcher program component to identify respective event-listening program components for receiving respective events.

8. A non-transitory computer-readable medium tangibly embodying program code comprising:
program code for executing a plurality of event-generating program components of an event-driven application, wherein the plurality of event-generating program components are configured to generate a plurality of events during execution of the event-driven application, wherein the plurality of event-generating program components comprise:
an input code component configured to generate input events identifying respective inputs received via a graphical interface of the event-driven application, and
an input/out code component configured to generate events for modifying the graphical interface in response to at least one of the input events;
program code for executing a plurality of event-listening program components, wherein each one event-listening program component of the plurality of event-listening program components is configured to begin or end a respective behavior based on listening to at least one event from at least one of the plurality of event-generating program components, wherein at least one of the plurality of event-listening program components comprises a display code component configured to render text or graphics for display via the graphical interface in response to at least one of the events for modifying the graphical interface;
program code for relaying, by an event dispatcher program component, the plurality of events from the plurality of event-generating program components to the plurality of event-listening program components;
program code for generating, by an event monitor component, a log identifying the plurality of events;
program code for identifying, based on the log identifying the plurality of events, an erroneous operation by the event-driven application that is associated with at least some event-listening program components of the plurality of event-listening program components, wherein the erroneous operation is caused by an erroneous sequence of operations, wherein the erroneous sequence of operations is associated with modifying the graphical interface in response to at least one of the input events relayed by the event dispatcher program component;
program code for automatically generating an additional interface for presenting source code corresponding to each of the at least some event-listening program components associated with the identified erroneous operation; and
program code for modifying at least some of the source code responsive to input received via the additional interface.

9. The computer-readable medium set forth in claim 8, wherein generating the log comprises identifying when the plurality of events occurred, and
further comprising program code for providing an indication of when a first event occurred with respect to when a second event occurred.

10. The computer-readable medium set forth in claim 9, wherein the indication comprises a timeline showing relative occurrences of the plurality of events.

11. The computer-readable medium set forth in claim 8, wherein the log comprises, for each event, a respective event identifier, a respective identity of a respective one of the plurality of event-generating program components that generated the event, and a respective identity of a respective one of the plurality of event-listening program components that listened to the event.

12. The computer-readable medium set forth in claim 11, wherein the log identifies, for each event, a relative time between when the event was generated and when the event was dispatched to the respective one of the plurality of event-listening program components that listened to the event.

13. A system comprising a processor configured to execute program components of an event-driven application tangibly embodied in a non-transitory computer-readable medium, the program components comprising:
a plurality of event-generating program components, wherein the plurality of event-generating program components are configured to generate a plurality of events during execution of the event-driven application, wherein the plurality of event-generating program components comprise:
an input code component configured to generate input events identifying respective inputs received via a graphical interface of the event-driven application, and
an input/out code component configured to generate events for modifying the graphical interface in response to at least one of the input events;
a plurality of event-listening program components, wherein each event-listening program component of the plurality of event-listening program components is configured to begin or end a respective behavior based on listening to at least one event from at least one of the plurality of event-generating program components, wherein at least one of the plurality of event-listening program components comprises a display code component configured to render text or graphics for display via the graphical interface in response to at least one of the events for modifying the graphical interface;
an event dispatcher program component configured to relay the plurality of events from the plurality of event-generating program components to the plurality of event-listening program components;
an event monitor program component configured to:
generate an event log identifying the plurality of events, and
identify, based on the event log identifying the plurality of events, an erroneous operation by the event-driven application that is associated with at least some event-listening program components of the plurality of event-listening program components, wherein the erroneous operation is caused by an erroneous sequence of operations, wherein the erroneous sequence of operations is associated with modifying the graphical interface in response to at least one of the input events relayed by the event dispatcher program component; and
at least one program component configured to:
automatically generate an additional interface for presenting source code corresponding to each of the at least some event-listening program components associated with the identified erroneous operation, and
responsive to input received via the additional interface, modify at least some of the source code.

14. The system set forth in claim 13,
wherein generating the event log comprises identifying when the plurality of events occurred, and wherein the at least one program component is further configured to provide output indicating when a first event occurred with respect to when a second event occurred.

15. The system set forth in claim 14, wherein the output comprises a timeline showing relative occurrences of the plurality of events.

16. The system set forth in claim 14, wherein the program components further comprise an execution environment that provides the event dispatcher program component as a linked program component during execution of the event-driven application.

17. The system set forth in claim 13, wherein the event log identifies, for each event, a relative time between when an event was generated and when the event was dispatched to a respective one of the plurality of event-listening program components that listened to the event.

18. A method, comprising:
configuring a computing apparatus to execute event-driven applications by programming the computing apparatus with software which provides an event-driven execution environment including:
 a plurality of event-generating program components of an event-driven application, wherein the plurality of event-generating program components is configured to generate a plurality of events during execution of the event-driven application, wherein the plurality of event-generating program components comprise:
  an input code component configured to generate input events identifying respective inputs received via a graphical interface of the event-driven application, and
  an input/out code component configured to generate events for modifying the graphical interface in response to at least one of the input events,
 a plurality of event-listening program components, wherein each event-listening program component of the plurality of event-listening program components is configured to begin or end a respective behavior based on listening to at least one event from at least one of the plurality of event-generating program components, wherein at least one of the plurality of event-listening program components comprises a display code component configured to render text or graphics for display via the graphical interface in response to at least one of the events for modifying the graphical interface,
 an event dispatcher program component configured to relay the plurality of events from the plurality of event-generating program components to the plurality of event-listening program components;
 while the event-driven application is executing, generating, by an event monitor program component, a log identifying the plurality of events; and
 identifying, based on the log identifying the plurality of events, an erroneous operation by the event-driven application that is associated with at least some event-listening program components of the plurality of event-listening program components, wherein the erroneous operation is caused by an erroneous sequence of operations, wherein the erroneous sequence of operations is associated with modifying the graphical interface in response to at least one of the input events relayed by the event dispatcher program component;
automatically generating an additional interface for presenting source code corresponding to each of the at least some event-listening program components associated with the identified erroneous operation; and
responsive to input received via the additional interface, modifying at least some of the source code.

* * * * *